United States Patent [19]
Evans et al.
[11] Patent Number: 4,933,226
[45] Date of Patent: Jun. 12, 1990

[54] THERMAL PRINT ELEMENT COMPRISING A MAGENTA 3-ARYL-2-ARYLAZO-5-AMINOTHIAZOLE OR AMINOTHIOPHENE DYE STABILIZED WITH A CYAN INDOANILINE DYE

[75] Inventors: Steven Evans, Rochester; Helmut Weber, Webster, both of N.Y.

[73] Assignee: Eastman Kodak Company, Rochester, N.Y.

[21] Appl. No.: 449,629

[22] Filed: Dec. 11, 1989

[51] Int. Cl.$^5$ ........................ B41M 5/35; B41M 5/26; B32B 3/10

[52] U.S. Cl. ........................................ 428/195; 8/471; 428/412; 428/480; 428/913; 428/914; 503/227

[58] Field of Search .................... 8/471; 428/195, 412, 428/480, 913, 914; 503/227

[56] References Cited

U.S. PATENT DOCUMENTS

| | | | |
|---|---|---|---|
| 4,250,090 | 2/1981 | Eilingsfeld et al. | 260/158 |
| 4,483,795 | 11/1984 | Eilingsfeld et al. | 534/756 |
| 4,695,287 | 9/1987 | Evans et al. | 8/471 |
| 4,748,149 | 5/1988 | Byers | 503/227 |
| 4,769,360 | 9/1988 | Evans et al. | 503/227 |

*Primary Examiner*—Bruce H. Hess
*Attorney, Agent, or Firm*—Harold E. Cole

[57] ABSTRACT

A thermal print element comprising a support having thereon a layer containing a thermally-transferred dye image, the dye image comprising a magenta dye having the following formula:

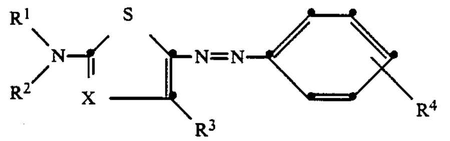

wherein:

wherein $R^1$ and $R^2$ are each independently hydrogen or a substituted or unsubstituted alkyl, cycloalkyl, or aryl group, or may be joined together to form a 5- or 6-membered, substituted or unsubstituted, heterocyclic ring system;

$R^3$ is a substituted or unsubstituted aryl group having from about 6 to about 10 carbon atoms;

$R^4$ represents at least one electron withdrawing group;

X is 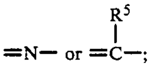 ; and $R^5$ is hydrogen, alkoxycarbonyl, cyano, halogen, carbamoyl, acyl, alkylsulfonyl, arylsulfonyl, sulfamoyl or alkyl, or may represent the atoms necessary to join with $R^2$ to form a 5- to 7-membered, substituted or unsubstituted, heterocyclic ring system;

the dye image also comprising a cyan indoaniline dye in the same areas as the magenta dye to provide improved stability top light for the magenta dye, the cyan indoaniline dye having the formula:

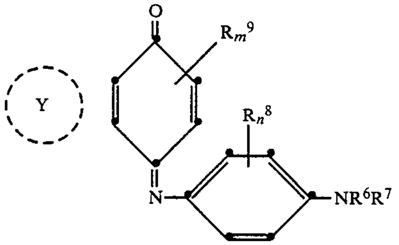

wherein:

$R^6$ and $R^7$ are each independently hydrogen or a substituted or unsubstituted alkyl, cycloalkyl, or aryl group;

$R^8$ represents hydrogen, a substituted or unsubstituted alkyl group, alkoxy, halogen, $-NHCOR^1$ or $-NHSO_2R^1$;

$R^9$ represents hydrogen or a substituted or unsubstituted alkyl, cycloalkyl, or aryl group, $-CONHR^6$, $-CN$, $-Cl$, $-NHCOR^6$, $-NHCO_2R^6$, $-NHCONHR^6$, $-NHCON(R^6)_2$, $-SO_2NHR^6$, $-NHSO_2R^6$, $-SCN$ or

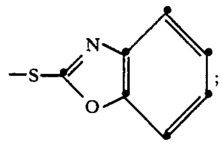

;

Y represents a hydrogen or the atoms necessary to complete a 5- or 6-membered, substituted or unsubstituted, carbocyclic or heterocyclic ring system;

n is 1-4; and n is 1-4.

12 Claims, No Drawings

THERMAL PRINT ELEMENT COMPRISING A MAGENTA 3-ARYL-2-ARYLAZO-5-AMINOTHIAZOLE OR AMINOTHIOPHENE DYE STABILIZED WITH A CYAN INDOANILINE DYE

This invention relates to a thermal print element comprising a magenta 3-aryl-2-arylazo-5-aminothiazole or aminothiophene dye image having a cyan indoaniline dye in the same areas to provide improved stability to light for the magenta dye.

In recent years, thermal transfer systems have been developed to obtain prints from pictures which have been generated electronically from a color video camera. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye-donor element is placed face-to-face with a dye-receiving element. The two are then inserted between a thermal printing head and a platen roller. A line-type thermal printing head is used to apply heat from the back of the dye-donor sheet. The thermal printing head has many heating elements and is heated up sequentially in response to the cyan, magenta and yellow signals. The process is then repeated for the other two colors. A color hard copy is thus obtained which corresponds to the original picture viewed on a screen. Further details of this process and an apparatus for carrying it out are contained in U.S. Pat. No. 4,621,271 by Brownstein entitled "Apparatus and Method For Controlling A Thermal Printer Apparatus," issued November 4, 1986, the disclosure of which is hereby incorporated by reference.

Stability to light for a thermally transferred dye is important in both an absolute and relative sense. In a monochrome system formed by a combination of two or more dyes, it is important that each of the dyes fade at approximately the same rate. If they do not, then the image will change hue.

U.S. Pat. Nos. 4,769,360 and 4,695,287 relate to cyan indoaniline dyes used in thermal dye transfer systems. U.S. Pat. No. 4,748,149 relates to a yellow merocyanine dye stabilized with a cyan indoaniline dye. There is no disclosure in these patents, however, of using cyan indoaniline dyes to stabilize arylazo-aminothiazole or -aminothiophene dyes.

U.S. Pat. Nos. 4,483,795 and 4,250,090 relate to the use of arylazoaminothiazole compounds for dyeing textiles. There is no disclosure in these patents, however, that these dyes could be used for thermal dye transfer systems.

There is a problem with using arylazoaminothiazole dyes in a thermal dye transfer system in that their stability to light is very poor. It would be desirable to provide a way to stabilize arylazoaminothiazole dyes used to obtain thermal prints against fading by light.

These and other objects are achieved in accordance with the invention which comprises a support having thereon a layer containing a thermally-transferred dye image, the dye image comprising a magenta dye having the following formula:

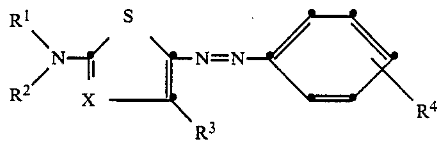

wherein:

$R^1$ and $R^2$ are each independently hydrogen or a substituted or unsubstituted alkyl group, preferably having from 1 to about 6 carbon atoms, e.g., methyl, ethyl, propyl, isopropyl, butyl, pentyl, hexyl, methoxyethyl, benzyl, 2-methanesulfonamidoethyl, 2-hydroxyethyl, 2-cyanoethyl, methoxycarbonylmethyl, etc.; a substituted or unsubstituted cycloalkyl group, preferably having from 5 to about 7 carbon atoms, such as cyclohexyl, cyclopentyl, etc; or a substituted or unsubstituted aryl group, preferably having from about 5 to about 10 carbon atoms, such as phenyl, pyridyl, naphthyl, p-tolyl, p-chlorophenyl, m-(N-methyl sulfamoyl)phenyl, m-chlorophenyl, p-methoxyphenyl, m-bromophenyl, o-tolyl, etc; or may be joined together to form a 5- or 6-membered, substituted or unsubstituted, heterocyclic ring system;

$R^3$ is a substituted or unsubstituted aryl group having from about 6 to about 10 carbon atoms such as those listed above for $R^1$;

$R^4$ represents at least one electron withdrawing group, such as nitro, cyano, halogen, carbamoyl, carbonyl, trifluoromethyl, arylazo, arylsulfonyl, alkylsulfonyl, sulfamoyl, acyl, dicyanovinyl, tricyanovinyl, or the atoms necessary to complete a 5- or 6-membered, substituted or unsubstituted, carbocyclic or heterocyclic ring system;

X is $=N-$ or $=C(R^5)-$; and $R^5$ is hydrogen, alkoxycarbonyl, cyano, halogen, carbamoyl, acyl, alkylsulfonyl, arylsulfonyl, sulfamoyl or alkyl, or may represent the atoms necessary to join with $R^2$ to form a 5- to 7-membered, substituted or unsubstituted, heterocyclic ring system;

the dye image also comprising a cyan indoaniline dye in the same areas as the magenta dye to provide improved stability to light for the magenta dye, the cyan indoaniline dye having the formula:

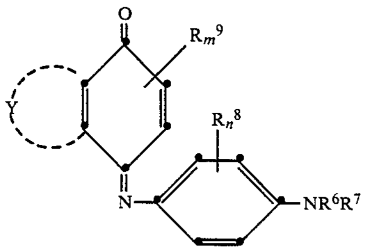

wherein:

$R^6$ and $R^7$ are each independently hydrogen or a substituted or unsubstituted alkyl, cycloalkyl, or aryl group, such as those listed above for $R^1$;

$R^8$ represents hydrogen, a substituted or unsubstituted alkyl group, such as those listed above for $R^1$, alkoxy, halogen, $-NHCOR^1$ or $-NHSO_2R^1$;

$R^9$ represents hydrogen or a substituted or unsubstituted alkyl, cycloalkyl, or aryl group, such as those listed above for $R^1$, $-CONHR^6$, $-CN$, $-Cl$, $-NHCOR^6$, $-NHCO_2R^6$, $-NHCONHR^6$, $-NHCON(R^6)_2$, $-SO_2NHR^6$, $-NHSO_2R^6$, $-SCN$ or

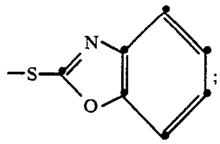

;

Y represents hydrogen or the atoms necessary to complete a 5- or 6-membered, substituted or unsubstituted, carbocyclic or heterocyclic ring system such as 3H-indole, benzoxazole, thiazoline, benzimidazole, oxazole, or thiazole;

n is 1–4; and m is 1–4.

In a preferred embodiment of the invention, the cyan indoaniline dye has the formula:

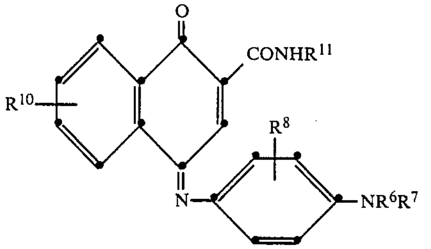

wherein $R^6$, $R^7$ and $R^8$ are defined as above;

$R^{10}$ is hydrogen; a substituted or unsubstituted alkyl group of from 1 to about 6 carbon atoms; halogen; $-NHCOR^6$ or $-NHSO_2R^6$; and $R^{11}$ is the same as $R^6$.

In yet another preferred embodiment, $R^{11}$ in the above formula for the cyan indoaniline dye is methyl. In still yet another preferred embodiment, $R^6$ and $R^7$ are each ethyl. In another preferred embodiment, each $R^8$ is hydrogen or methyl. In still another preferred embodiment, $R^{11}$ is methyl and $R^6$ and $R^7$ are each ethyl. Further details of the above cyan indoaniline dyes are contained in U.S. Pat. No. 4,695,287, the disclosure of which is hereby incorporated by reference.

In another preferred embodiment of the invention, $R^3$ in the formula for the magenta dye is phenyl. In yet another preferred embodiment, $R^1$ and $R^2$ are each independently hydrogen, a substituted or unsubstituted alkyl group having from 1 to about 6 carbon atoms, or a substituted or unsubstituted aryl group having from about 5 to about 10 carbon atoms.

Magenta compounds included within the scope of the invention include the following:

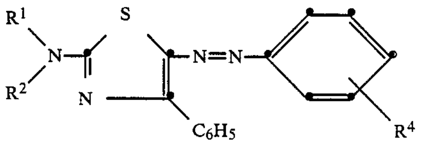

| | $R^1$ | $R^2$ | X | $R^4$ | |
|---|---|---|---|---|---|
| (1) | $-H$ | $-CH_2C_6H_5$ | $=N-$ | 2,4-$NO_2$ | 6-CN |
| (2) | $-CH_3$ | $-C_6H_4$(p-$CH_3$) | $=N-$ | 2,4-$NO_2$ | 6-CN |
| (3) | $-C_2H_5$ | $-C_6H_4$(m-$CH_3$) | $=N-$ | 2,4-$NO_2$ | 6-CN |
| (4) | $-CH_3$ | $-C_6H_5$ | $=N-$ | 2,4-$NO_2$ | 6-CN |
| (5) | $-CH_3$ | $-CH_3$ | $=N-$ | 2-Cl | 4-$NO_2$ |
| (6) | $-H$ | -n-$C_3H_7$ | $\overset{\|}{-C}-CO_2C_2H_5$ | 2-Cl | 4-$NO_2$ |
| (7) | $-H$ | $-H$ | $\overset{\|}{-C}-CO_2C_2H_5$ | 2-Cl | 4-$NO_2$ |

Cyan indoaniline dyes included within the scope of the invention include the following:

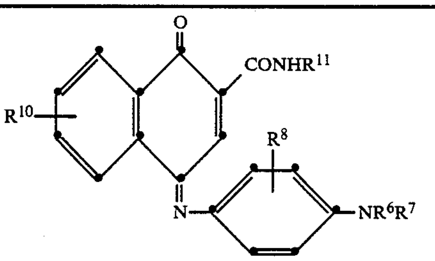

| Compound No. | $R^6$ | $R^7$ | $R^8$ | $R^{10}$ | $R^{11}$ |
|---|---|---|---|---|---|
| A | $C_2H_5$ | $C_2H_5$ | H | H | $CH_3$ |
| B | $C_2H_5$ | $C_2H_5$ | 2-$CH_3$ | H | $CH_3$ |
| C | $C_2H_5$ | $C_2H_5$ | 2-$CH_3$ | H | n-$C_4H_9$ |
| D | $-CH_2CH_2NHSO_2CH_3$ | $C_2H_5$ | 2-$CH_3$ | H | $-CH_2C_6H_5$ |
| E | $-CH_2CH_2OCH_3$ | $C_2H_5$ | 2-$CH_3$ | H | $CH_3$ |
| F | $C_2H_5$ | $C_2H_5$ | 2-$CH_3$ | 5-$NHSO_2CH_3$ | $C_2H_5$ |
| G | $CH_3$ | $CH_3$ | H | H | $C_6H_5$ |
| H | $-CH_2CH_2OH$ | $C_2H_5$ | 2-$CH_3$ | H | $CH_3$ |
| I | $C_2H_5$ | $C_2H_5$ | $-NH\overset{O}{\overset{\|}{C}}CH_3$ | H | $CH_3$ |
| J | $C_2H_5$ | $C_2H_5$ | H | H | $CH_3$ |
| K | $C_2H_5$ | $C_2H_5$ | H | H | t-$C_4H_9$ |
| L | $C_2H_5$ | $C_2H_5$ | H | H | $-CH_2C_6H_5$ |
| M | $C_2H_5$ | $C_2H_5$ | H | H | $-C_6H_{11}$(ring) |
| N | $C_2H_5$ | $C_2H_5$ | 2-$CH_3$ | 5-$NHSO_2CH_3$ | $CH_3$ |
| O | $C_2H_5$ | $C_2H_5$ | 2-$CH_3$ | H | $C_6H_5$ |
| P | $C_2H_4OH$ | $C_2H_5$ | 2-$CH_3$ | H | $CH_3$ |
| Q | $C_2H_4OH$ | $C_2H_5$ | 2-$CH_3$ | H | $CH_2CH_2OCH_3$ |
| R | $CH_2CH_2NHSO_2CH_3$ | $C_2H_5$ | 2-$CH_3$ | H | $CH_3$ |
| S | $C_2H_5$ | $C_2H_5$ | 2-$CH_2CH_2-NHSO_2CH_3$ | H | $CH_3$ |
| T | | | 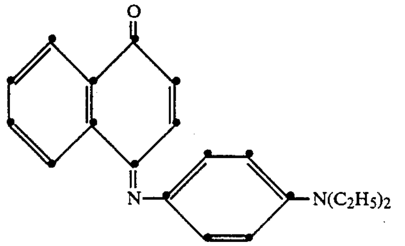 | | |
| U | | | 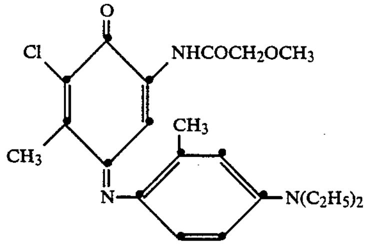 | | |

When a yellow dye is also transferred to the thermal print element of the invention described above which contains a magenta and a cyan indoaniline dye image, then a good neutral (monochrome) image may be obtained.

A dye-donor element is used to make the thermal print element of the invention and comprises the dyes described above dispersed in a polymeric binder such as a cellulose derivative, e.g., cellulose acetate hydrogen phthalate, cellulose acetate, cellulose acetate propionate, cellulose acetate butyrate, cellulose triacetate, or any of the materials described in U.S. Pat. No. 4,700,207; a polycarbonate; poly(styrene-co-acrylonitrile), a poly(sulfone) or a poly(phenylene oxide). The binder may be used at a coverage of from about 0.1 to about 5 $g/m^2$.

The dye layers of the dye-donor element may be coated on the support or printed thereon by a printing technique such as a gravure process.

Any material can be used as the support for the dye-donor element provided it is dimensionally stable and can withstand the heat of the thermal printing heads. Such materials include polyesters such as poly(ethylene terephthalate); polyamides; polycarbonates; glassine paper; condenser paper; cellulose esters such as cellulose acetate; fluorine polymers such as polyvinylidene fluoride or poly(tetrafluoroethylene-co-hexafluoropropylene); polyethers such as polyoxymethylene; polyacetals; polyolefins such as polystyrene, polyethylene, polypropylene or methylpentane polymers; and polyimides such as polyimide-amides and polyether-imides. The support generally has a thickness of from about 2 to about 30 μm. It may also be coated with a subbing layer, if desired.

The reverse side of the dye-donor element may be coated with a slipping layer to prevent the printing head from sticking to the dye-donor element. Such a slipping layer would comprise a lubricating material such as a surface active agent, a liquid lubricant, a solid lubricant or mixtures thereof, with or without a polymeric binder. Preferred lubricating materials include oils or semi-crystalline organic solids that melt below 100° C. such as poly(vinyl stearate), beeswax, perfluorinated alkyl ester polyethers, poly(caprolactone), silicone oil, poly(tetrafluoroethylene), carbowax or poly(ethylene glycols), or any of the materials disclosed in U.S. Pat. Nos. 4,717,711, 4,717,712, 4,737,485, and 4,738,950. Suitable polymeric binders for the slipping layer include poly(vinyl alcohol-co-butyral), poly(vinyl alcohol-co-acetal) poly(styrene), poly(vinyl acetate), cellulose acetate butyrate, cellulose acetate, or ethyl cellulose.

The amount of the lubricating material to be used in the slipping layer depends largely on the type of lubricating material, but is generally in the range of about 0.001 to about 2 g/m$^2$. If a polymeric binder is employed, the lubricating material is present in the range of 0.1 to 50 weight %, preferably 0.5 to 40, of the polymeric binder employed.

As noted above, the dye-donor elements of the invention are used to form a dye transfer image. Such a process comprises imagewise-heating a dye-donor element as described above and transferring a dye image to a dye-receiving element to form the dye transfer image.

The dye-donor element used to make the thermal print elements of the invention may be used in sheet form or in a continuous roll or ribbon. If a continuous roll or ribbon is employed, it may have only the magenta and cyan dyes thereon as decribed above or may have alternating areas of other different dyes, such as sublimable yellow and/or black or other dyes.

The support for the thermal print element of the invention may be a transparent film such as a poly(ether sulfone), a polyimide, a cellulose ester such as cellulose acetate, a poly(vinyl alcohol-co-acetal) or a poly(ethylene terephthalate). The support may also be reflective such as baryta-coated paper, polyethylene-coated paper, white polyester (polyester with white pigment incorporated therein), an ivory paper, a condenser paper or a synthetic paper such as dePont Tyvek ®. In a preferred embodiment, polyester with a white pigment incorporated therein is employed.

The layer containing the dye image employed in the invention may comprise, for example, a polycarbonate, a polyurethane, a polyester, polyvinyl chloride, poly(styrene-co-acrylonitrile), poly(caprolactone) or mixtures thereof. The dye image-receiving layer may be present in any amount which is effective for the intended purpose. In general, good results have been obtained at a coverage of from about 1 to about 5 g/m$^2$.

In a preferred embodiment, a polycarbonate layer containing the dye image is used which has a number average molecular weight of at least about 25,000. The term "polycarbonate" as used herein means a polyester of carbonic acid and glycol or a divalent phenol. Examples of such glycols or divalent phenols are p-xylene glycol, 2,2-bis(4-oxyphenyl)propane, bis(4-oxyphenyl)methane, 1,1-bis(4-oxyphenyl)ethane, 1,1-bis-(oxyphenyl)butane, 1,1-bis(oxyphenyl)cyclohexane, 2,2-bis(oxy phenyl)butane, etc.

In an especially preferred embodiment of the invention, the above-described polycarbonate is a bisphenol A polycarbonate. In another preferred embodiment of the invention, the bisphenol A polycarbonate comprises recurring units having the formula:

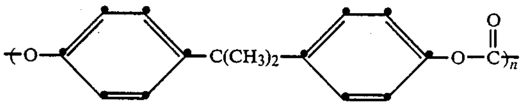

wherein n is from about 100 to about 500.

Examples of such polycarbonates include: General Electric Lexan ® Polycarbonate Resin #ML-4735 (Number average molecular weight app. 36,000), and Bayer AG, Makrolon #5705 ® (Number average molecular weight app. 58,000).

The polycarbonate employed in the layer containing the dye image may be present in any amount which is effective for the intended purpose. In general, good results have been obtained at a total coverage of from about 1 to about 5 g/m$^2$.

Thermal printing heads which can be used to transfer dye from the dye-donor elements used to make the thermal print elements of the invention are available commercially. There can be employed, for example, a Fujitsu Thermal Head (FTP-040 MCS001), a TDK Thermal Head F415 HH7-1089 or a Rohm Thermal Head KE 2008-F3.

The following examples are provided to illustrate the invention.

EXAMPLE 1

This example shows the improved dye stability obtained in blue images by stabilization of the magenta dyes of the invention with a cyan dye.

A magenta dye-donor element was prepared by coating the following layers in the order recited on a 6 μm poly(ethylene terephthalate) support:

(1) Subbing layer of duPont Tyzor TBT ® titanium tetra-n-butoxide (0.16 g/m$^2$) coated from a n-butyl alcohol and n-propylacetate solvent mixture, and (2) Dye layer containing the invention or comparison magenta dye indicated below (0.36 mmoles/m$^2$), FC-431 ® surfactant (3M Corp.) (0.002 g/m$^2$), in a cellulose acetate-propionate (2.5% acetyl, 48% propionyl) binder (weight equal to 2.6X that of the dye) coated from a cyclopentanone, toluene, and methanol solvent mixture.

A slipping layer was coated on the back side of the element similar to that disclosed in U.S. Pat. No. 4,829,050.

For production and evaluation of blue dye images, cyan dye-donors were also prepared as above but with the indicated cyan dye (0.28 g/m$^2$ for dye A), (0.32 g/m$^2$ for dye B) and cellulose acetate-propionate binder at a weight equal to 1.8X that of the dye were coated.

The following comparison magenta dyes were evaluated:

C-1

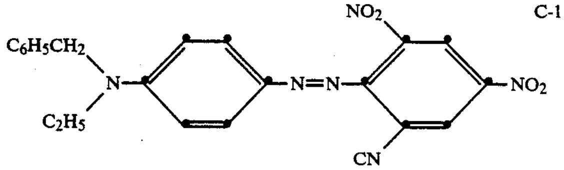

This is similar to those disclosed in EPA No. 235,939

C-2

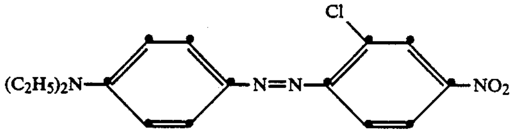

C-3

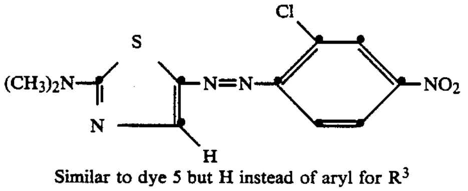

Similar to dye 5 but H instead of aryl for $R^3$

C-4

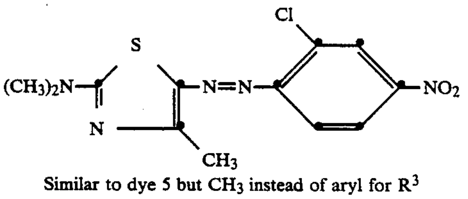

Similar to dye 5 but $CH_3$ instead of aryl for $R^3$

The cyan dyes A and U illustrated above were coated in cyan dye-donors.

A dye-receiving element was prepared by coating a solution of Makrolon 5705® (Bayer AG Corporation) polycarbonate resin (2.9 $g/m^2$) and polycaprolactone (0.8 $g/m^2$) in methylene chloride on a pigmented polyethylene-overcoated paper stock.

The dye side of the dye-donor element strip approximately 10 cm×13 cm in area was placed in contact with the dye image-receiving layer of the same area. The assemblage was clamped to a stepper motor driven 60 mm diameter rubber roller and a TDK Thermal Head (No. L-231) (thermostatted at 26° C.) was pressed with a force of 36N (8.0 pounds) against the dye-donor element side of the assemblage pushing it against the rubber roller.

The imaging electronics were activated causing the donor/receiver assemblage to be drawn between the printing head and roller at 6.9 mm/sec. Coincidentally, the resistive elements in the thermal print head were pulsed at 29 μsec/pulse at 128 μsec intervals during the 33 msec/dot printing time. A stepped density image was generated by incrementally increasing the number of pulses/dot from 0 to 255. The voltage supplied to the print head was approximately 23.5 volts, resulting in an instantaneous peak power of 1.3 watts/dot and a maximum total energy of 9.6 mjoules/dot.

Blue hue dye-images were obtained by sequentially printing a magenta and cyan dye-donor.

After printing, the receiving element was separated and the Status A green reflection densities of each stepped image consisting of a series of 11 graduated density steps 1 cm×1 cm were read.

The image were then subjected to High-Intensity Daylight fading (HID-fading) for 7 days, 50 klux, 5400° K., 32° C. approximately 25% RH and the densities were reread. The percent density loss from D-max (highest density step at 255 pulses) was calculated. The following results were obtained:

TABLE 1

Fading of Blue Images (Green Density)

| | | | Status A Green | |
|---|---|---|---|---|
| Magenta Dye | Cyan Dye | Initial* Density | % Fade Magenta Only | % Fade Blue Image |
| 1 | A | 0.9 | 35 | 3 |
| 2 | A | 1.0 | 28 | 5 |
| 3 | A | 1.0 | 29 | 6 |
| 4 | A | 1.0 | 31 | 5 |
| 5 | A | 1.6 | 41 | 3 |
| 5 | B | 1.6 | 41 | 0 |
| 6 | A | 1.6 | 84 | 3 |
| 7 | A | 1.3 | 73 | 6 |
| C-1 | A | 1.5 | 41 | 19,23 |
| | U | 1.5 | 41 | 28 |
| C-2 | A | 1.6 | 26 | 9 |
| | U | 1.6 | 26 | 13 |
| C-3 | A | 1.3 | 55 | 12 |
| | U | 1.3 | 55 | 14 |
| C-4 | A | 1.8 | 65 | 12 |
| | U | 1.8 | 65 | 14 |

*Initial density of the magenta transfer (i.e., the green density of the magenta component of the blue image transfer)

The data show that the magenta dyes of the invention show improved light stability when used in combination with different indoaniline cyan dyes to form a blue image.

EXAMPLE 2

This example shows the improved dye stability obtained in neutral images by stabilization of the arylazoamino-thiazole or -thiophene magenta dyes of the invention with a cyan dye in the presence of a yellow dye.

Magenta and cyan dye-donors were prepared as in Example 1.

For production and evaluation of neutral dye images (yellow+magenta+cyan), yellow dye donors were also prepared but the indicated yellow dye (0.18 $g/m^2$) and cellulose acetate-propionate binder (0.36 $g/m^2$) were coated.

The following yellow dye was coated in a yellow-dye donor:

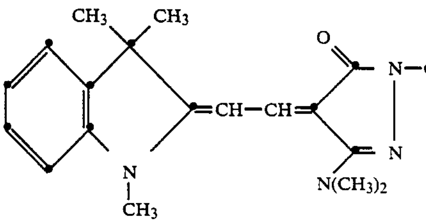

A pyrazolone merocyanine yellow dye

Dye-receivers were prepared as described in Example 1.

Printing using a thermal-head was as described in Example 1 except neutral images were obtained by sequential printing a magenta, cyan, and yellow dye donor.

The fading evaluation was done as described in Example 1 to give the following results;

TABLE 2

Fading of Neutral Images (Green Density)

| | | | Status A Green | | |
|---|---|---|---|---|---|
| Magenta Dye | Cyan Dye | Yellow Dye | Initial* Density | % Fade Magenta Only | % Fade Neutral Image |
| 1 | A | C | 0.9 | 35 | 2 |
| 2 | A | C | 1.0 | 28 | 2 |
| 3 | A | C | 1.0 | 29 | 3 |
| 4 | A | C | 1.0 | 31 | 3 |
| 5 | A | C | 1.6 | 41 | 3 |
| 5 | U | C | 1.6 | 41 | 3 |
| 6 | | | 1.6 | 84 | 1 |
| 7 | | | 1.2 | 73 | 4 |
| C-1 | A | C | 1.5 | 41 | 15,18 |
| | U | C | 1.5 | 41 | 25 |
| C-2 | A | C | 1.6 | 26 | 8 |
| | U | C | 1.6 | 26 | 9 |
| C-3 | A | C | 1.3 | 55 | 9 |
| | U | C | 1.3 | 55 | 11 |
| C-4 | A | C | 1.8 | 65 | 8 |
| | U | C | 1.8 | 65 | 8 |

*Initial density of the magenta transfer (i.e., the green density of the magenta component of the neutral image transfer)

The data show that as with the blue images of Example 1, the neutral images formed with the invention magenta dyes show less green dye density loss when stabilized with cyan dye.

The invention has been described in detail with particular reference to preferred embodiments thereof, but it will be understood that variations and modifications can be effected within the spirit and scope of the invention.

What is claimed is:

1. A thermal print element comprising a support having thereon a receiving layer containing a thermally-transferred dye image, the dye image comprising a magenta dye having the following formula:

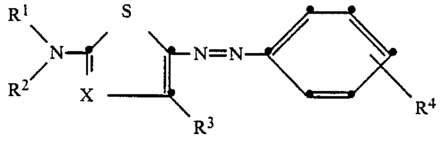

wherein:

$R^1$ and $R^2$ are each independently hydrogen or a substituted or unsubstituted alkyl, cycloalkyl, or aryl group, or may be joined together to form a 5- or 6-membered, substituted or unsubstituted, heterocyclic ring system;

$R^3$ is a substituted or unsubstituted aryl group having from about 6 to about 10 carbon atoms;

$R^4$ represents at least one electron withdrawing group;

X is $=N-$ or $=\overset{R^5}{\overset{|}{C}}-$; and $R^5$ is hydrogen, alkoxycarbonyl, cyano, halogen, carbamoyl, acyl, alkylsulfonyl, arylsulfonyl, sulfamoyl or alkyl, or may represent the atoms necessary to join with $R^2$ to form a 5- to 7-membered, substituted or unsubstituted, heterocyclic ring system;

said dye image also comprising a cyan indoaniline dye in the same areas as said magenta dye to provide improved stability to light for said magenta dye, the cyan indoaniline dye having the formula:

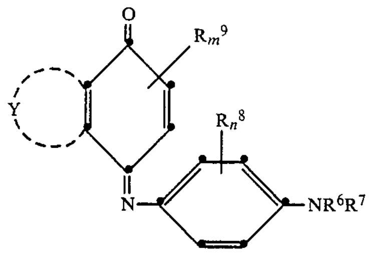

wherein:

$R^6$ and $R^7$ are each independently hydrogen or a substituted or unsubstituted alkyl, cycloalkyl, or aryl group;

$R^8$ represents hydrogen, a substituted or unsubstituted alkyl group, alkoxy, halogen, $-NHCOR^1$ or $-NHSO_2R^1$;

$R^9$ represents hydrogen or a substituted or unsubstituted alkyl, cycloalkyl, or aryl group, $-CONHR^6$, $-CN$, $-Cl$, $-NHCOR^6$, $-HNCO_2R^6$, $-NHCONHR^6$, $-NHCON(R^6)_2$, $-SO_2NHR^6$, $-NHSO_2R^6$, $-SCN$ or

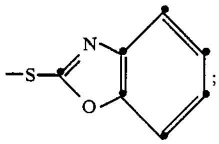;

Y represents hydrogen or the atoms necessary to complete a 5- or 6-membered, substituted or unsubstituted, carbocyclic or heterocyclic ring system;

n is 1–4; and m is 1–4.

2. The element of claim 1 wherein said $R^4$ is selected from nitro, cyano, halogen, carbamoyl, carbonyl, trifluoromethyl, arylazo, arylsulfonyl, alkylsulfonyl, sulfamoyl, acyl, dicyanovinyl, tricyanovinyl, or the atoms necessary to complete a 5- or 6-membered, substituted or unsubstituted, carbocyclic or heterocyclic ring system.

3. The element of claim 1 wherein $R^3$ is phenyl.

4. The element of claim 1 wherein $R^1$ and $R^2$ are each independently hydrogen, a substituted or unsubstituted alkyl group having from 1 to about 6 carbon atoms, or a substituted or unsubstituted aryl group having from about 5 to about 10 carbon atoms.

5. The element of claim 1 wherein said support comprises poly(ethylene terephthalate) having a white pigment incorporated therein.

6. The element of claim 1 wherein said cyan indoaniline dye has the formula:

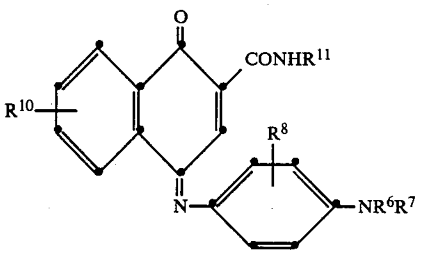

wherein $R^6$, $R^7$ and $R^8$ are defined as in claim 1;

$R^{10}$ is hydrogen; a substituted or unsubstituted alkyl group of from 1 to about 6 carbon atoms; halogen; $-NHCOR^6$ or $-NHSO_2R^6$; and $R^{11}$ is the same as $R^6$.

7. The element of claim 6 wherein $R^{11}$ is methyl.

8. The element of claim 6 wherein $R^6$ and $R^7$ are each ethyl.

9. The element of claim 6 wherein each $R^8$ is hydrogen or methyl.

10. The element of claim 6 wherein $R^{11}$ is methyl and $R^6$ and $R^7$ are each ethyl.

11. The element of claim 1 wherein said receiving layer containing said dye image is a polycarbonate having a number average molecular weight of at least about 25,000.

12. The element of claim 11 wherein said polycarbonate is a bisphenol A polycarbonate comprising recurring units having the formula:

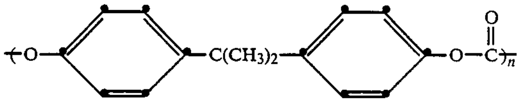

wherein n is from about 100 to about 500.

* * * * *